United States Patent
Sylvester

(12) 
(10) Patent No.: US 6,499,727 B1
(45) Date of Patent: Dec. 31, 2002

(54) INTERNAL DRIVE AERATOR FOR BODY OF LIQUIDS

(76) Inventor: Jack Bill Sylvester, P.O. Box 845, 11195 McCully Rd., Louisville, MS (US) 39339

( * ) Notice: Subject to any disclaimer, the term of this patent is extended or adjusted under 35 U.S.C. 154(b) by 0 days.

(21) Appl. No.: 09/882,157

(22) Filed: Jun. 15, 2001

(51) Int. Cl.[7] .............................................. B01D 47/16
(52) U.S. Cl. ...................... 261/92; 261/120; 210/242.2
(58) Field of Search .................... 261/92, 120, DIG. 71; 210/758, 765, 219, 242.2; 366/343

(56) References Cited

U.S. PATENT DOCUMENTS

| | | | |
|---|---|---|---|
| 3,362,695 A | 1/1968 | McDonnell | 261/92 |
| 3,452,873 A | 7/1969 | Blough | 210/219 |
| 3,561,738 A | 2/1971 | Galeano | 261/92 |
| 3,703,462 A | 11/1972 | Smith | 210/7 |
| 3,759,495 A | 9/1973 | Boler et al. | 261/92 |
| 3,799,515 A | 3/1974 | Geerlings | 261/92 |
| 4,190,619 A | 2/1980 | Cherne | 261/92 |
| 4,409,107 A | 10/1983 | Busch | 210/758 |
| 4,608,162 A * | 8/1986 | Hankes et al. | 261/92 |
| 4,621,400 A * | 11/1986 | Van Der Graaf | 29/123 |
| 5,116,501 A | 5/1992 | House | 210/242.2 |
| 5,156,532 A | 10/1992 | Arndt et al. | 417/360 |
| 5,176,503 A | 1/1993 | Palmer et al. | 417/61 |
| 5,330,639 A | 7/1994 | Murphree | 210/170 |
| 5,934,447 A * | 8/1999 | Kanaris | 198/834 |
| 5,948,326 A | 9/1999 | Pate | 261/91 |

* cited by examiner

*Primary Examiner*—C. Scott Bushey
(74) *Attorney, Agent, or Firm*—Ohlandt, Greeley Ruggiero & Perle LLP

(57) ABSTRACT

An aerator or destratifier used to provide Oxygen to standing or less active bodies of water. The aerator has a non-floating internally driven motor within a non-floating sealed drum. The drum and motor are supported by a support frame attached to floatation devices.

A plurality of elliptically shaped paddles are externally affixed to the exterior surface of the non-floating drum. Rotation of the drum by the internal motor and gearbox causes rotation of the plurality of paddles affixed to the drum exterior.

The plurality of paddles cause agitation of the body of water and allow Oxygen to be dissolved therein.

12 Claims, 11 Drawing Sheets

INTERNAL DRIVE AERATOR FOR BODY OF LIQUIDS

FIELD OF THE INVENTION

This invention pertains to agitation of water for increasing levels of dissolved Oxygen for the purpose of sustaining increased growth of aerobic organisms.

BACKGROUND OF THE INVENTION

The amount of organisms that can be supported by any particular environment is dependant on the available resources found within that environment. The ability of an environment to support life, and the concentration of the population, is governed by limiting factors. In a terrestrial environment, the limiting factors are usually the concentration of nutrients and the amount of space available to the organism in question. In an aqueous environment, the amount of dissolved Oxygen is an additional limiting factor when considering growth of aerobic organisms.

It is generally known that higher levels of dissolved Oxygen exist in water that is turbulent. Thus, turbulent water is able to support a higher concentration of aerobic life than standing water. Less active water will contain less dissolved Oxygen and will thus support a lower concentration of aerobic life.

When considering a body of water that is inactive or stagnant, such as a pond or a standing tank, the amount of dissolved Oxygen may be low in concentration. Additionally, stratification within a body of water can arise due to stagnation or a decreased amount of turbulence. Stratification is manifested as distinct bands of water in which the temperature may vary significantly from one band to the next. As is generally known, water of different temperatures will have different solubility factors for molecules such as Oxygen. These variances can be detrimental to aquatic life. Water that is colder will have a lower solubility for Oxygen and therefore be less capable of supporting particular kinds and/or amounts of aquatic aerobic life. Aerobic life in these situations is limited by the amount of Oxygen available for respiration. In situations where high concentrations of aerobic life are desirable, control of the amount of dissolved Oxygen as a limiting factor is extremely important. Accordingly, maintaining a consistent temperature or a temperature that varies within certain parameters is an important consideration when attempting to establish an optimum growth environment.

Introduction of air, and thus Oxygen, into aqueous environments using artificial means has been utilized for many years. The most common example would be aeration using an air pump to bubble air, and thus Oxygen, through the standing water of a recreational fish tank. In an industrial setting, aeration of water is performed by either spraying water into the air using jets or by agitating the water using paddles or brushes. All of these examples accomplish the common goal to varying degrees of introducing air bubbles into the water, thus increasing the amount of surface to air contact and therefore increasing the opportunity of dissolving Oxygen into the water.

In addition to the introduction of Oxygen into the water, aerators also help to destratify water by causing turbulence, thus mixing the different temperature bands and creating a more unified environmental temperature. The success of this is dependant on the power of the aerator/destratifier and the depth of the body of water.

Most of the agitating aerators in use today utilize one or more mechanical paddle wheels, with paddles attached to external drive shafts and employ external floatation devices. Motors are mounted externally on a frame which exposes them to possible damage from water and atmospheric conditions.

Exposure to the elements produces many problems with current aerators using external parts. Metal parts become weakened from erosion and rust, and must be serviced or replaced periodically. Moving parts such as bearings and shafts, must be lubricated often because of their constant exposure to water. Periodic cleaning is necessary to remove calcium and algae deposits that continuously build up on the aerators.

Engineering problems also plague currently available aerators. The motor providing the power source for the aerators may be either on board or remote from the paddle wheel. Aerators using a remote motor must have a power delivery system to the paddle wheel. Aerators using on-board motors as power sources must have a way to secure and protect the motor. External on-board motors must have weatherproof casings to protect the motors from the elements. Aerators using on-board motors must utilize a floatation device buoyant enough to support the additional weight of the motor.

Due to the shallow depth of the water in which the aerators are being used, there is a limitation to the size of the floatation device and the motor. The efficiency of a device to aerate water is generally expressed as pounds of dissolved Oxygen per horsepower per hour. Increasing the horsepower will increase the amount of dissolved Oxygen. However, increasing the horsepower will also increase the size and weight of the motor and gearbox. Increasing the size and weight of the motor and gearbox will require a larger support system. Therefore, floating aerators with external on-board motors have a reduced efficiency due to the limitation on the size of motor and gearbox that can be used and how they are attached to the paddle drum.

In the fishery industry, more precisely, the catfish industry, the amount of dissolved Oxygen directly affects the quantity of fish in a population as well as the size of the catfish. To increase the percent yield of any particular fish farm, the water has to be agitated to prevent stagnation, increase dissolved Oxygen, and to prevent stratification. The amount of horsepower necessary to accomplish these goals vary according to the size of the pond or holding tank as well as the population of fish present.

With respect to wastewater treatment, high levels of dissolved Oxygen are required to maintain maximum aerobic respiration. Wastewater treatment using aerobic microorganisms requires constant aeration of the wastewater liquor. Wastewater treatment currently favours the use of microorganisms such as bacteria for biological decomposition of waste material into harmless or useful products. Bacterial respiration may involve aerobic and/or anaerobic bacteria. Anaerobic bacteria do not tolerate high levels of Oxygen and in fact, high concentrations of Oxygen are detrimental to anaerobic bacterial populations.

Respiration by anaerobic bacteria generally produces undesirable noxious odors and is a slower process than aerobic respiration. Conversely, aerobic respiration is a faster process and the final products are not usually noxious. For example, aerobic respiration of organic waste would yield carbon dioxide and water, as well as the oxidized waste material. Thus, increasing the concentration of dissolved Oxygen in wastewater would reduce the population of anaerobic bacteria and increase the population of aerobic bacteria.

In the case of stagnant wastewater, bacterial respiration depletes the concentration of Oxygen present in the wastewater. Thus, as aerobic bacteria respire, the concentration of Oxygen decreases, hence, the concentration of aerobic bacteria, able to flourish in this environment, decreases. The lack of Oxygen would then allow the concentration of anaerobic bacteria to increase. Since anaerobic respiration is a less desirable form of wastewater treatment, methods of adding Oxygen to the wastewater are required.

BRIEF SUMMARY OF THE INVENTION

It is the object of this invention to provide an improved aeration device capable of using an internally mounted on-board motor and gearbox, and capable of creating greater turbulence and thus delivering a greater Oxygen transfer than previously possible.

It is a further object of this invention to provide aeration paddles of unique design and construction for improved turbulence and increased Oxygen transfer.

The aerators according to the present invention overcome the deficiencies of previous aerators by providing an aerator having a smaller raft type device with a frame and floatation, a non-floating drum mounted on the frame, the drum having a plurality of externally mounted paddles affixed along the length of the outer surface of the drum. The interior of the drum is sealed and has an internally mounted motor and gearbox, mounted inside the drum and which turns the drum. The drum is connected to a frame by a fixed stationary shaft extending through the drum and mounted therein in sealed bearings. The shaft is fixed to the frame.

Other objects, features and advantages of this invention will become obvious upon reference to the following detailed description of the invention and the drawings illustrating the preferred embodiments thereof.

IN THE DRAWINGS

DESCRIPTION OF A SPECIFIC EMBODIMENT

As explained above, the aerator introduces air and thus Oxygen into standing liquid, typically water, for the purpose of increasing the concentration of dissolved Oxygen for aerobic respiration. An aerator of this type is desirable for many fish farms and wastewater treatment facilities.

In fish farming, increases in the concentration of Oxygen means an increase in the population of fish stock, and therefore increased economic gains for fish farmers. Development of an affordable aerator that is capable of providing an increased percent yield of dissolved Oxygen efficiently is a valuable asset to fish farmers.

In wastewater treatment facilities, an aerator with a hermetically sealed motor and gearbox would mean less servicing and repairs. Additionally, an internally driven aerator system is more compact and can support a much larger horsepower motor and gearbox system than an aerator with an externally mounted motor and gearbox.

Although principally intended for introduction of Oxygen for aeration of water, the present aerator may be used to introduce any gas into any given liquid medium. The aerator may be used in any chemical or biological process that requires high levels of gas dissolved in the liquor for increased or optimum yield of an end product. An example of a biological process is wastewater treatment of activated sludge wherein increased amounts of dissolved Oxygen are required to allow respiration of aerobic bacteria. Purification of drinking water using Ozone could also utilize the present aerator if used in a closed environment filled with Ozone gas, for example.

Many types of aerators have been developed in the past. Examples are aerators that have to be anchored to the shore and therefore are only efficient in small bodies of water.

The present aerator uses a frame mounted on floatation devices, providing a type of raft. A non-floating drum, driven by an internal motor is supported by the frame on floatation devices. The present aerator may be anchored to the shoreline but is not limited to tethering to the shore alone, but can be anchored at a distance from the shore, and therefore may be used in large bodies of water.

Figure 1:
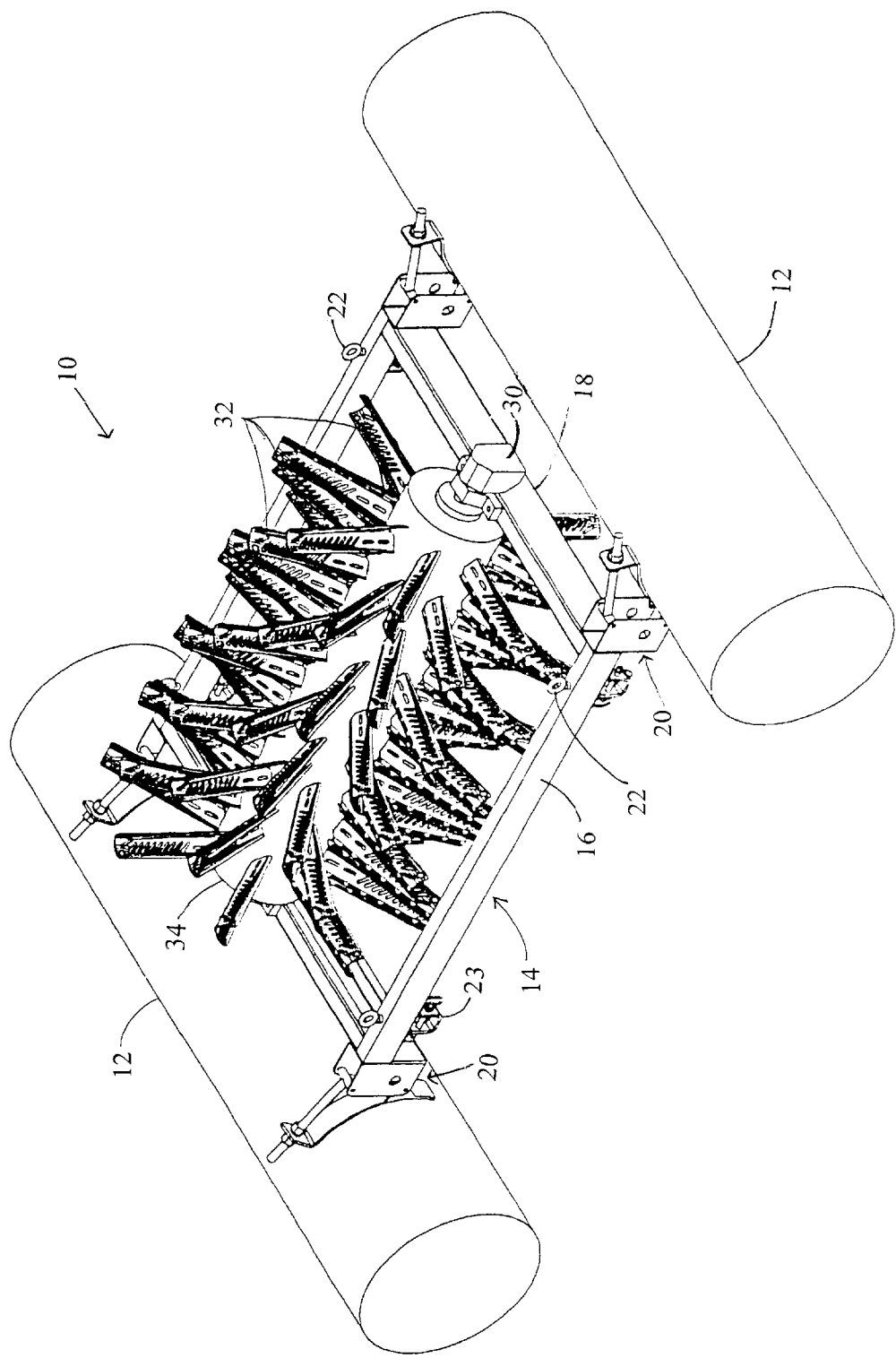
FIG. 1 is an isometric view showing an aerator illustrating a preferred embodiment of the invention.
Figure 2:
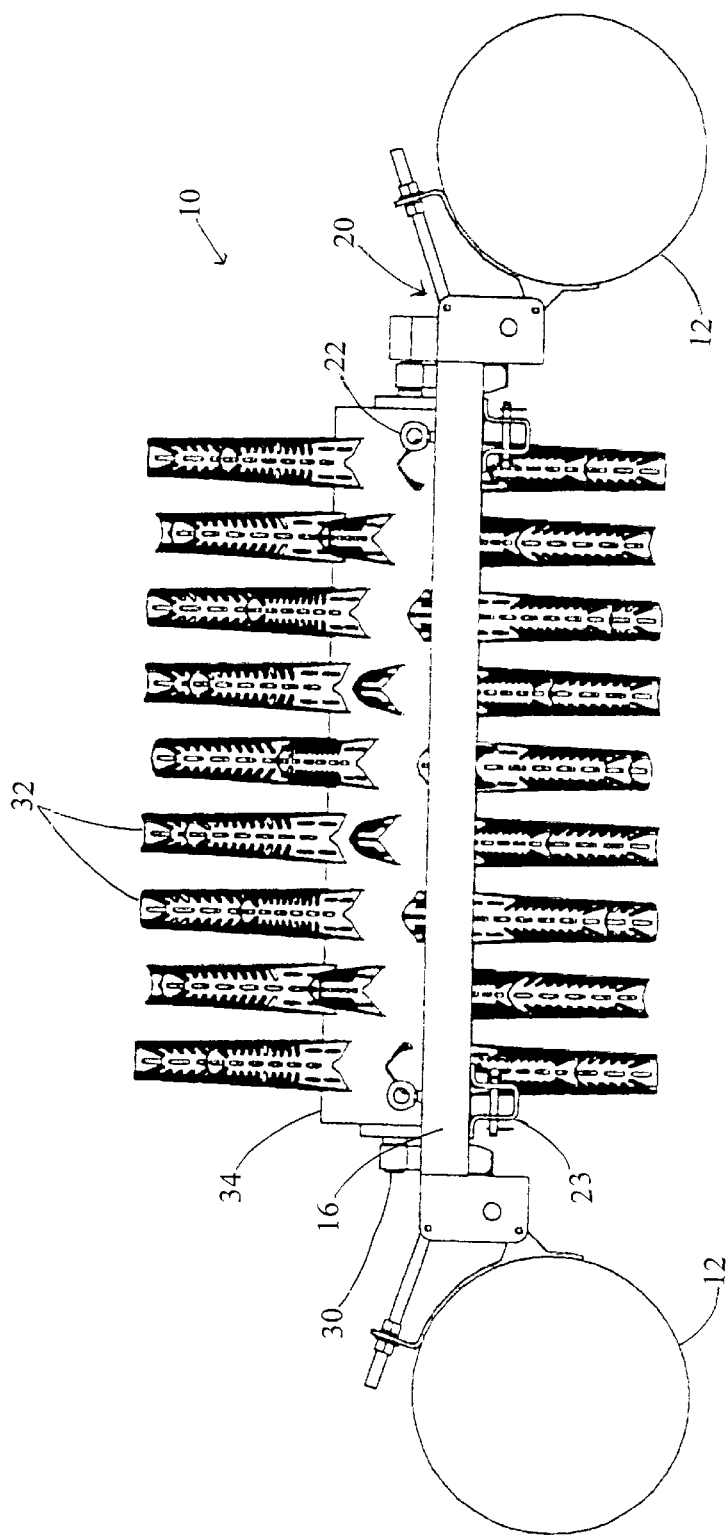
FIG. 2 is an front view of the aerator of FIG. 1.
Figure 3:
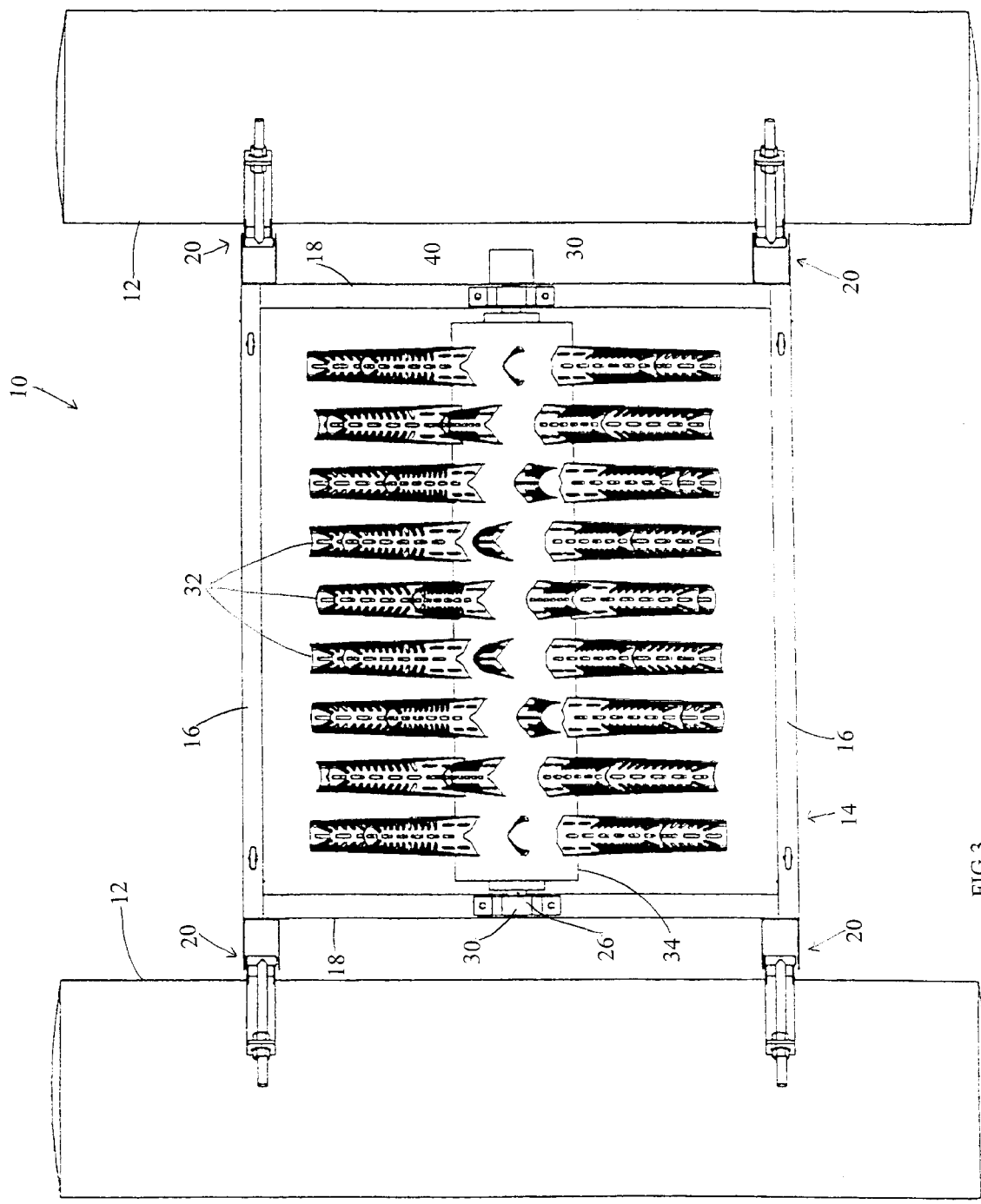
FIG. 3 is a top view of the device of FIG. 1.
Figure 4:
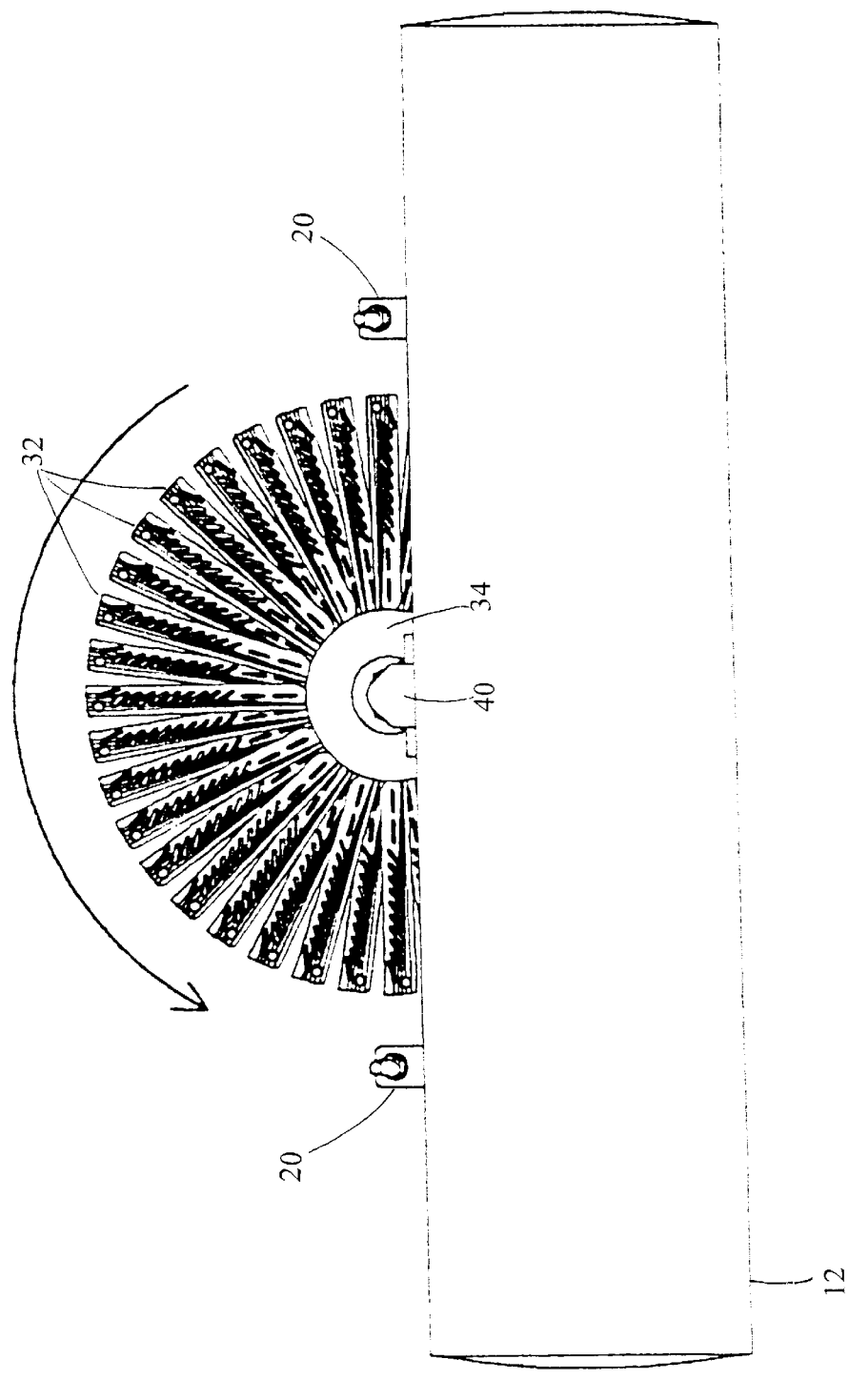
FIG. 4 is a right side view of the device of FIG. 11 showing rotation of the paddle drum.
Figure 5:
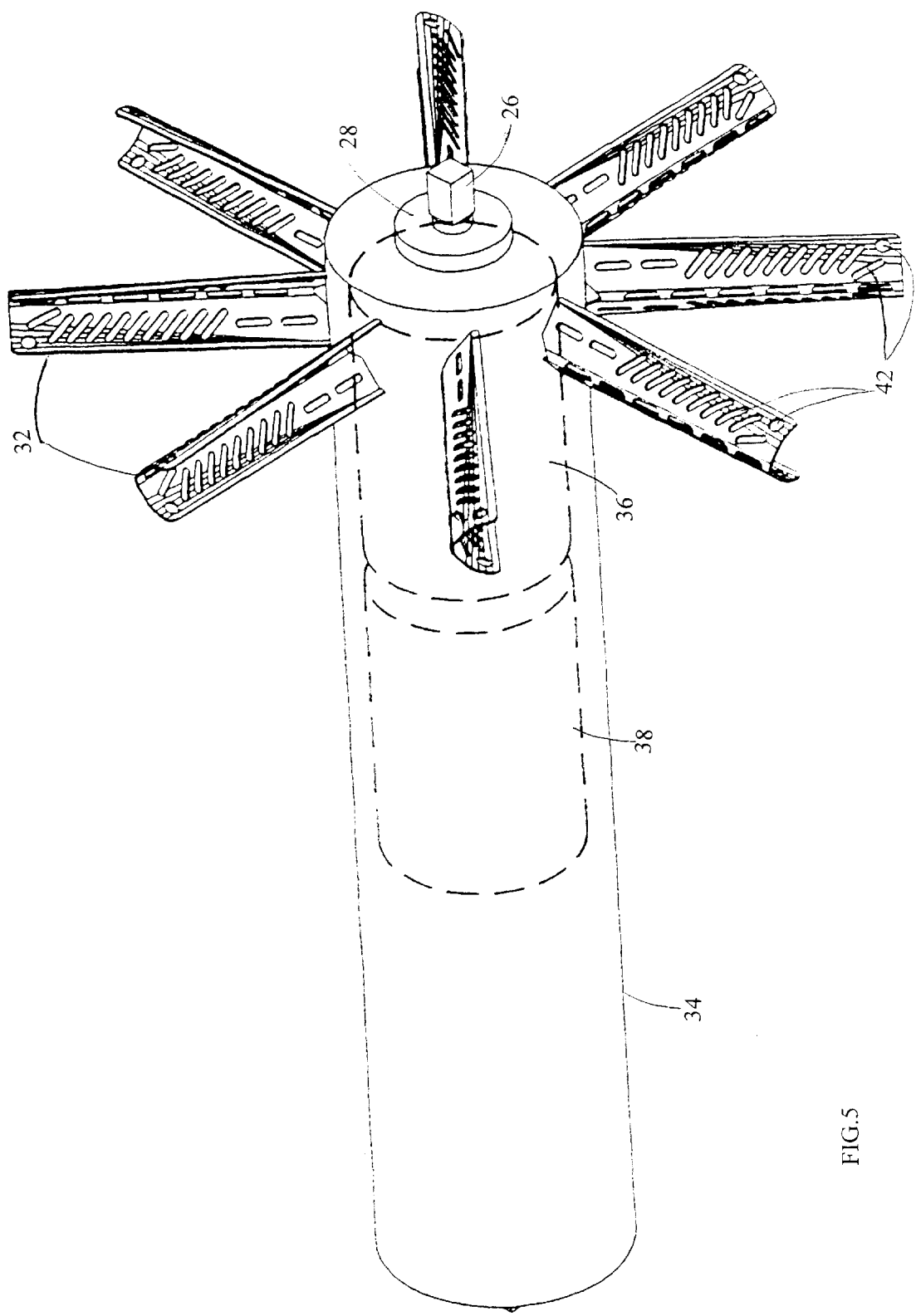
FIG. 5 is an isometric view of the paddle drum showing placement of one row of paddles, and the internal motor and gearbox shown in phantom.
Figure 6:
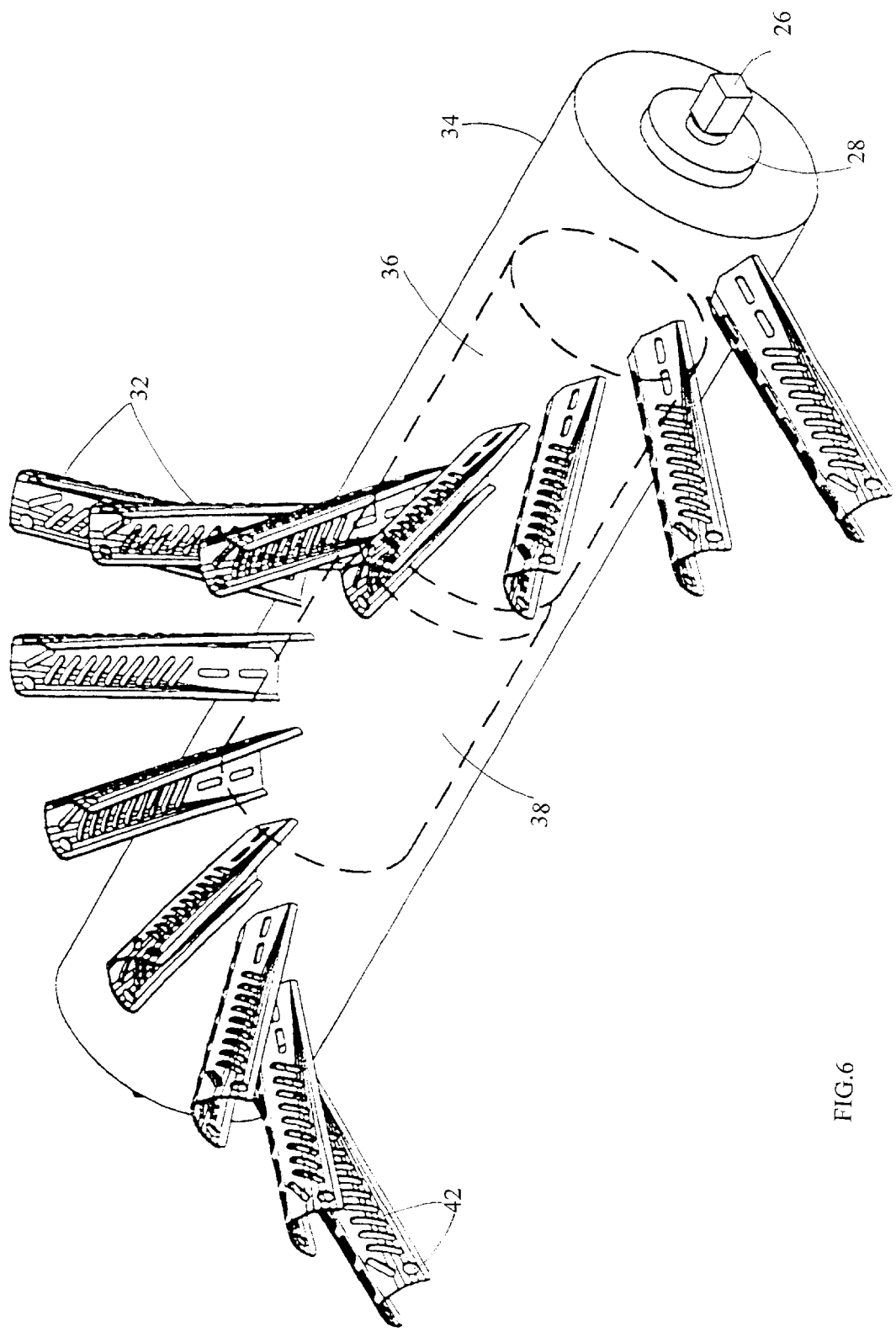
FIG. 6 is an isometric view of the paddle drum showing the sigmoidal placement of paddles along the length of the drum and internal motor and gearbox shown in phantom.
Figure 7:
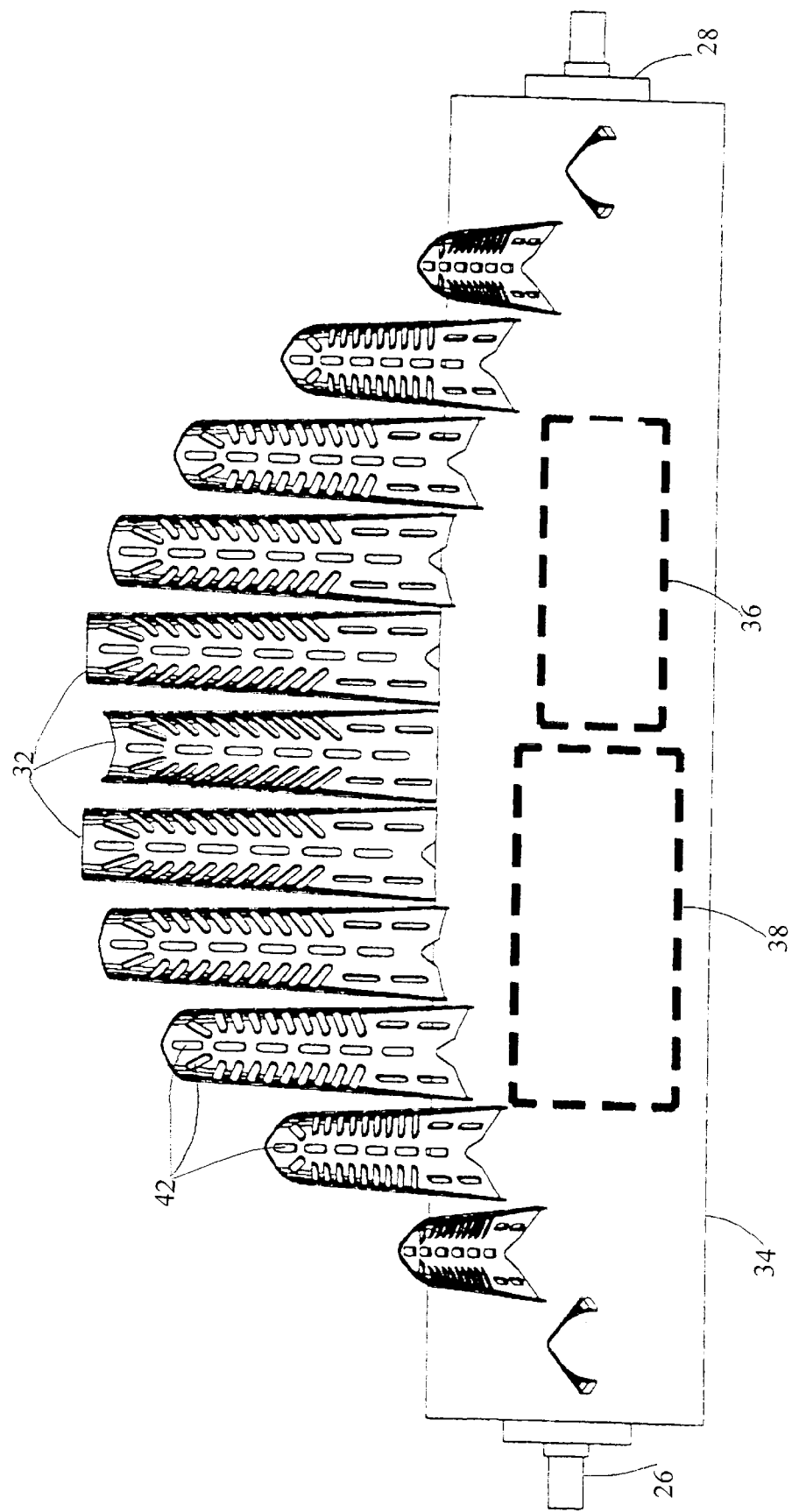
FIG. 7 is an isometric view of the paddle drum showing the graduating angle of paddle placement as it progresses along the sigmoidal pattern on the drum.
Figure 8:
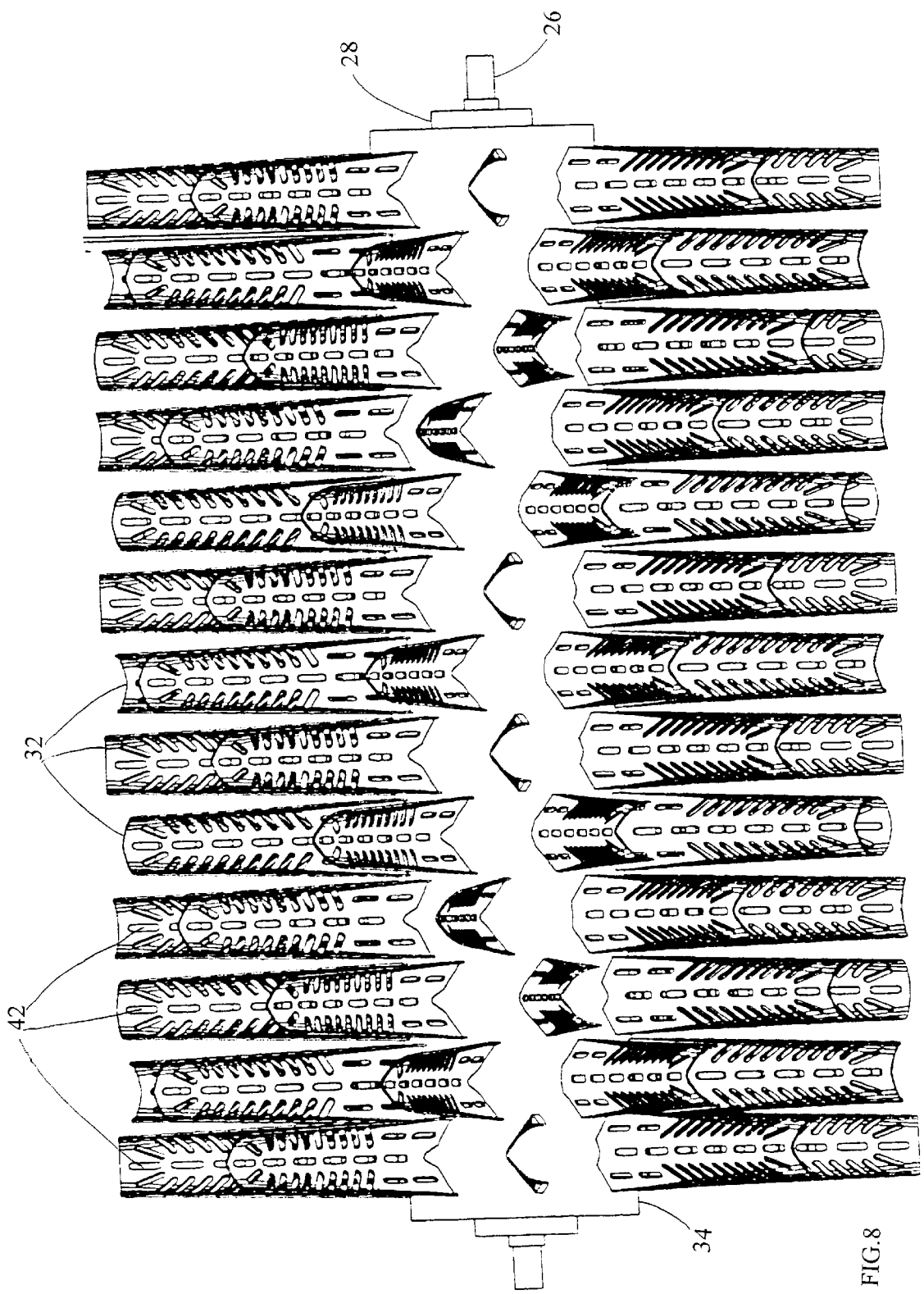
FIG. 8 is an isometric view showing a plurality of paddles along the length of the drum.
Figure 9:
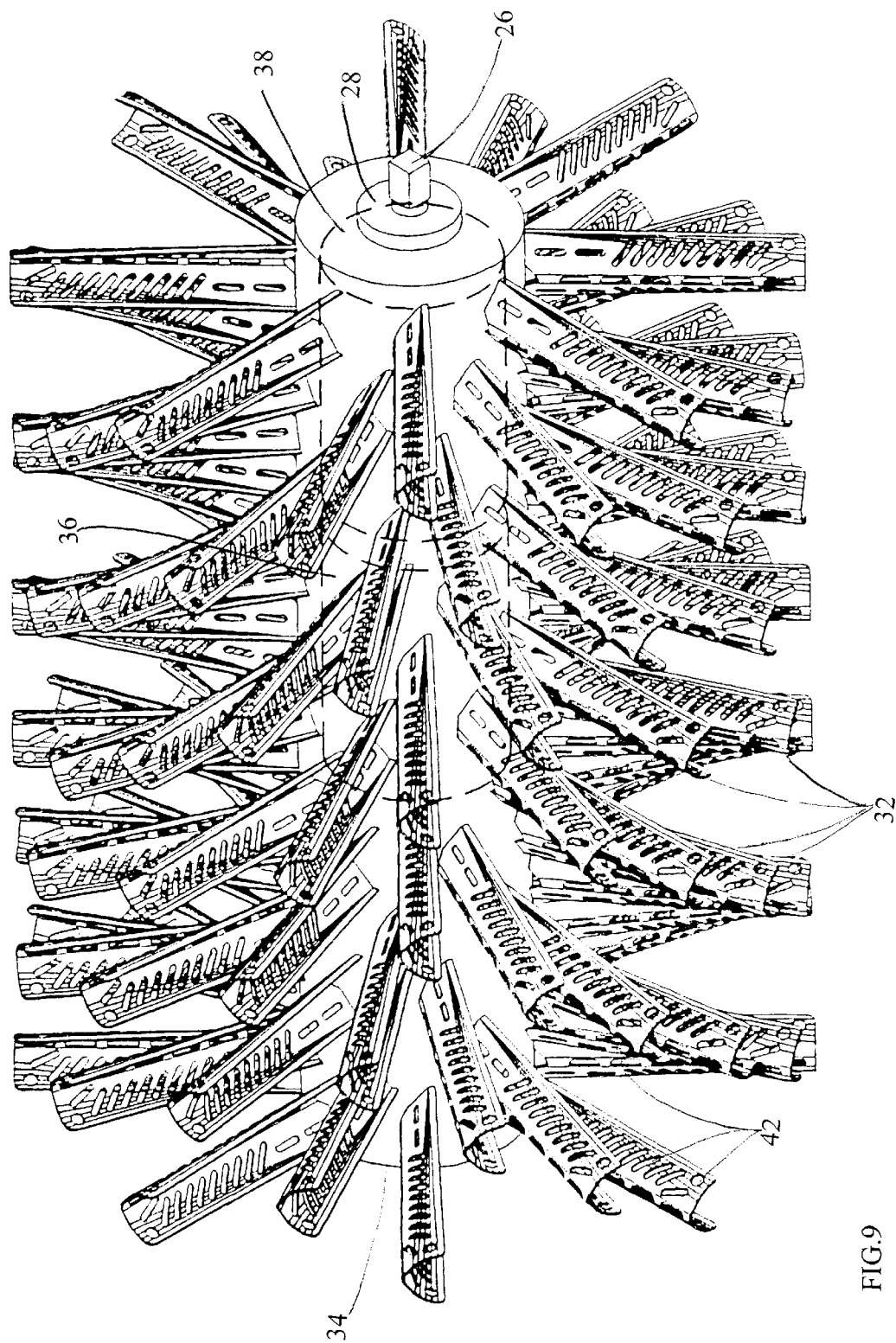
FIG. 9 Is an end view of the drum showing a plurality of paddles extending around the full perimeter of the drum; and, FIG. 10a is a schematic diagram showing a perforated paddle before shaping.
Figure 10:
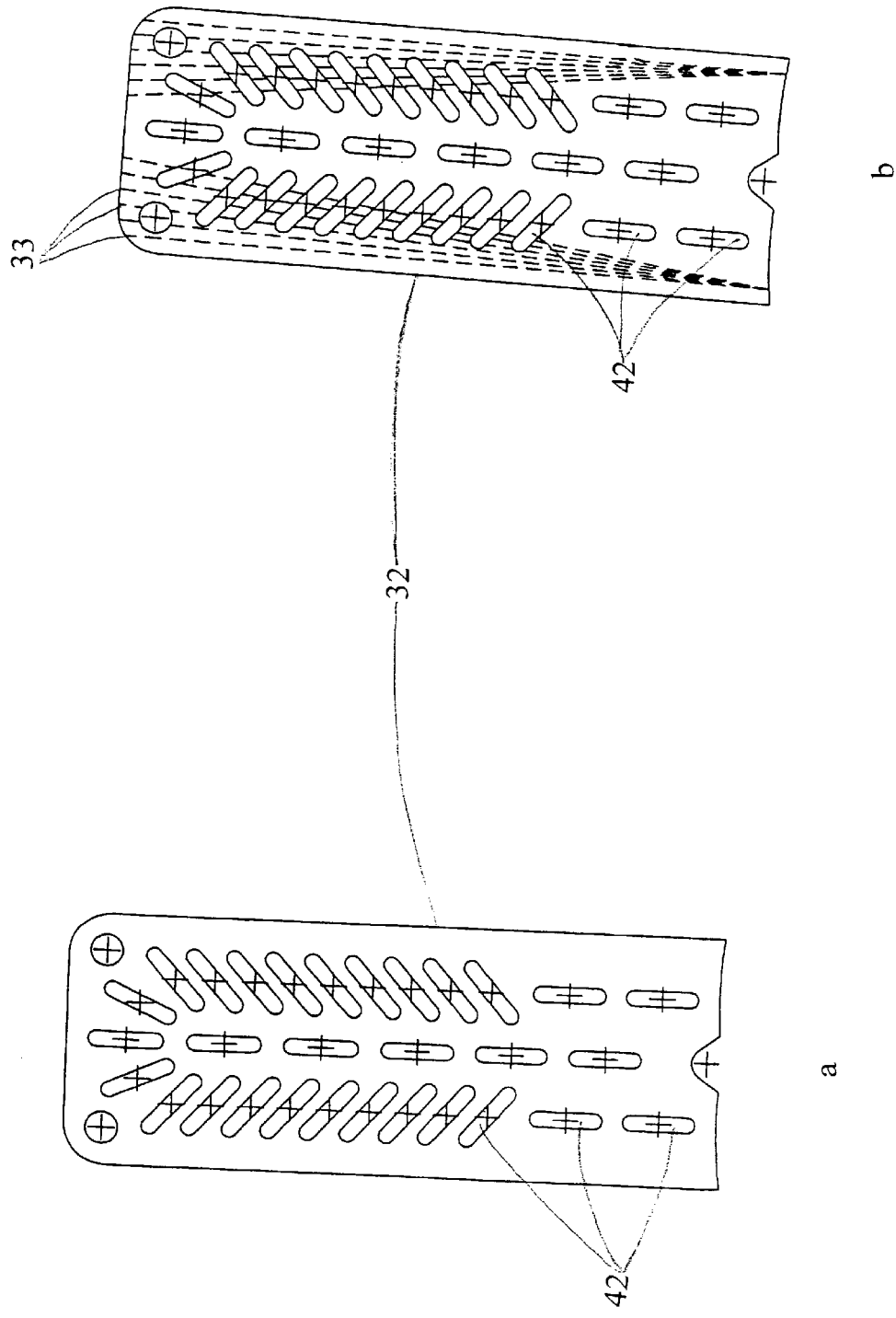
FIG. 10b is a schematic diagram illustrating the perforated paddle laser etched for shaping along the etched lines.
Figure 11:
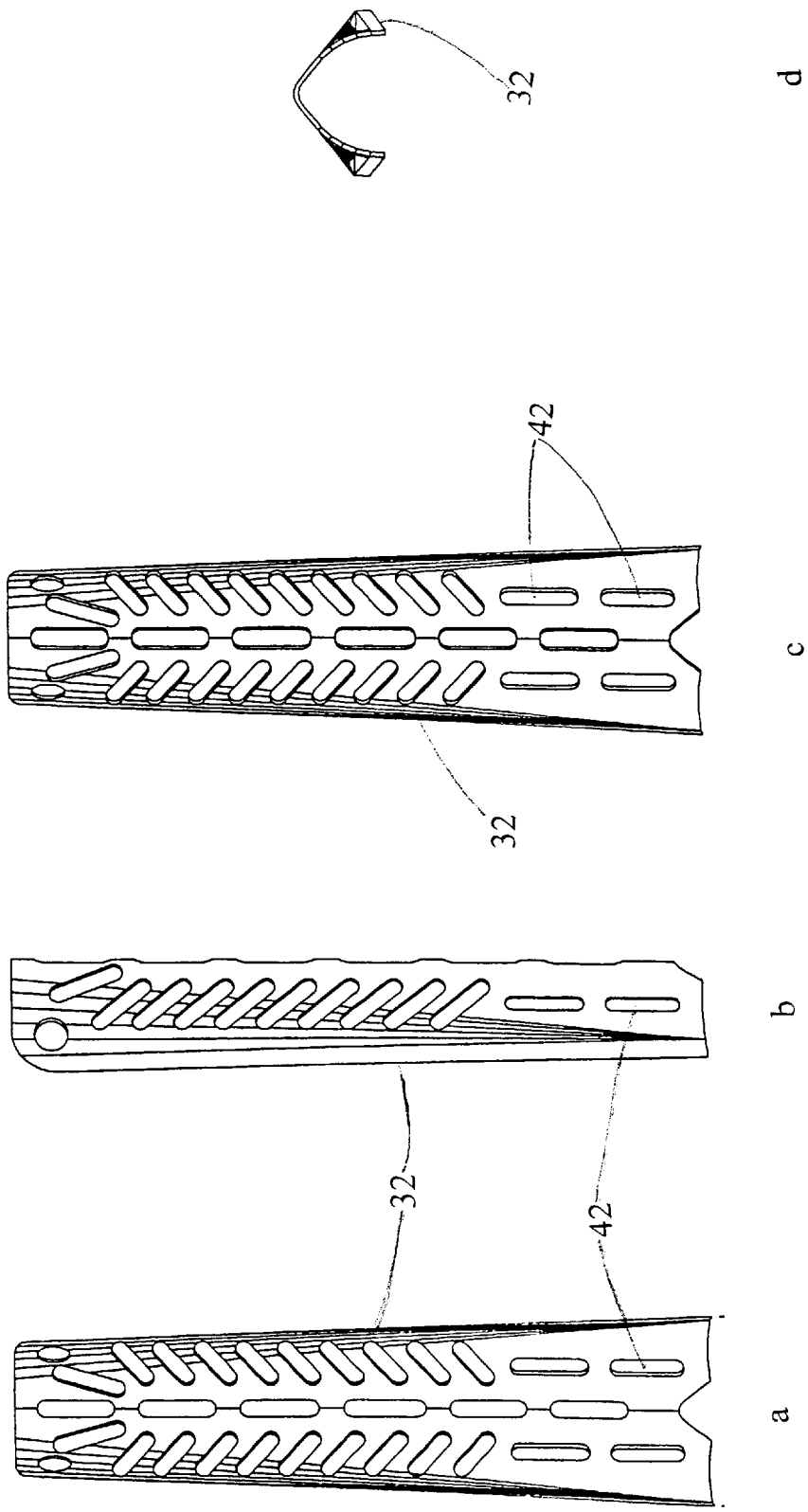
FIGS. 11a, 11b, 11c, 11d are front, side, rear side, and end views of the elliptically shaped paddle.

As set out in FIG. 1, the present aerator is an aeration apparatus(10) utilized to aerate or destratify bodies of water. The aeration apparatus(10) consists of two or more floatation devices(12), attached to a support frame(14), providing a type of raft structure.

The floatation devices(12) may be of any suitable type and size sufficient to support the weight of the aeration apparatus(10). The support frame (14) consists of two crossbeams(16) with two parallel beams(18) connecting the crossbeams(16) into a square or rectangular configuration. It should be noted that the configuration is not limited to a square or rectangular configuration. The crossbeams(16) are fixed to the floatation devices(12) by fastening brackets(20). Eyelet hooks(22) are bolted or welded to the crossbeam(16) and are utilized for lifting the aerator(10). Guideline brackets(23) with locking mechanisms are used for attachment of anchoring cables(not shown). The anchoring cables are tethered to stationary objects(not shown). The stationary objects for example may be stakes on the shoreline or sunken weights offshore. An internally driven drum(34), is mounted for rotation on a stationary shaft(26). The shaft is mounted through the drum and extends out of each end of the internally driven drum(34) through sealed bearings(28). The shaft(26) is non-rotatably fixed and supported by shaft receiver brackets(30) on the frame parallel beams(18) at both ends of the shaft(26).

A plurality of elliptically shaped external paddles(32) (discussed in more detail below) are attached to the periphery of the drum(34) and extend outwardly therefrom.

An internal drum motor(36) is mounted on the stationary shaft(26) within the sealed drum(34). A gearbox(38) is driven by the motor(36) and is in turn connected to drive the drum(34) by any suitable means not shown.

An example of an internally driven sealed drum can be found in the Van Der Graaf Inc. U.S. Pat. Nos. 5,934,447 and 4,621,400. The design of this drum is particularly suitable for the purposes of the invention. However, the invention is not restricted solely to such an internal drive drum. Various different forms of an internal drive drum would be suitable for the purpose.

Rotation of the drum(34), by the motor(36) and gear box(38), therefore causes rotation of the external elliptical paddles(32) projecting from the periphery of the drum(34). The plurality of elliptical paddles(32) are therefore driven through the water with direct relation to the rotation of the drum(34).

The power supply for the motor(36) and gearbox(38) is supplied by a waterproof cable(not shown) running underwater from a control box on shore or from a building. The power cable is attached to a rotary connection box(40) on one end of the stationary shaft(26). From box(40), an internal power cable runs through the stationary shaft(26) to the motor(36).

In the preferred embodiment, the paddles are made of a non-corrosive metal, but are not limited to this material. Other embodiments of the illustrated invention may have paddles made of various types of metal or UV protected plastic. The paddles have been progressively and sequentially angled into a series of shallow "V" shaped forms, thus forming a paddle(32) having a generally elliptical shaped transverse-cross section. The paddles(32) are bent along laser etched lines(33) to form the general "V" shape. The bend lines(33) are formed fan-wise from the base to the free end of the paddles(32). Thus paddles(32) are wider at their base and narrower at their free end.

In addition, each elliptical paddle(32) has been perforated. The plurality of perforations(42) increase the turbulence created by the paddles(32) as they are driven through the water, and thus increase the concentration of Oxygen delivered to the water by the agitation of the water as it is forced through the perforations(42). It should be noted that the number of perforations may vary depending on the amount of agitation required. In general, the greater the number of perforations in an elliptically shaped paddle(32), the greater the agitation, depending upon the area of the paddles(32) and the size and shape of the perforations(42).

The elliptical paddles(32) are integrally externally fixed to the outside of the drum(34) in a staggered or sigmoidal fashion. Staggering the paddle(32) placement enhances the amount of turbulence created with relation to the horsepower of the drive motor(36). Increased turbulence is thus accomplished because the paddles(32) strike the water at different moments in time thus causing a greater agitation than possible with synchronized water strikes. The water is forced along the length of the elliptical paddle(32) as the paddle(32) slices through the water, thus increasing the turbulence. As the paddle(32) re-surfaces into the air, sub-surface water still clinging to the paddle(32) is exposed to the air. When the paddle(32) re-enters the water, air clinging to the paddle(32) is forced below the water surface.

The combination of an internally mounted motor(36) and gearbox(38) together with sigmoidally attached elliptically shaped perforated paddles(32) enables the creation of a compact aerator that has a higher energy efficiency than previously accomplished with current aerators tested. Tests run on the preferred embodiment detailed in this description, showed a substantial increase in the energy efficiency of the unit when compared with aerators tested having externally mounted motors of the same horsepower.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An aerator or destratifier for a liquid medium comprising:
   an environmentally sealed drum having a first and second end and a continuous side surface there between;
   a stationary shaft extending from said first and second ends;
   a plurality of paddles affixed to the exterior surface of said continuous side surface of said drum;
   at least one floatation device;
   a motor and gearbox for driving said drum, mounted internally of said drum;
   a support frame for supporting said drum on the floatation device; and
   a power supply for supplying power for driving said motor.

2. An aerator as claimed in claim 1 wherein said internal motor and said gearbox are mounted on said stationary shaft.

3. An aerator as claimed in claim 2 wherein said stationary shaft extends through said first and said second ends of said drum, and including sealed bearings on said first and said second ends for supporting said stationary shaft.

4. An aerator as claimed in claim 1 wherein said support frame includes support shaft receptors, said stationary shaft received therein.

5. An aerator as claimed in claim 1 wherein said support frame includes fastening devices said floatation devices secured to said support frame thereby.

6. An aerator as claimed in claim 1 wherein said plurality of paddles are affixed to said continuous side surface in a staggered sigmoidal pattern.

7. An aerator as claimed in claim 6 wherein said paddles are perforated.

8. An aerator as claimed in claim 7 wherein said paddles are elliptically shaped, said elliptical shaped formed by progressive bends in said paddles.

9. An aerator as claimed in claim 8 wherein said paddles have a series of generally fan shaped bends.

10. An aerator as claimed in claim 9 wherein said paddles are wider at the base and narrower at the ends.

11. An aerator or destratifier for a liquid medium comprising:
    an environmentally sealed drum having a first and second end and a continuous side surface there between;
    a stationary shaft extending from said first and second ends;
    a plurality of paddles affixed to the exterior surface of said continuous side surface of said drum;
    at least one floatation device;
    a motor and gearbox for driving said drum, mounted internally of said drum;
    a support frame for supporting said drum on the floatation device; and
    a power supply for supplying power for driving said motor;

said internal motor and said gearbox are mounted on said stationary shaft;

said stationary shaft extends through said first and said second ends of said drum, and including sealed bearings on said first and said second ends for supporting said stationary shaft;

said support frame includes support shaft receptors, said stationary shaft received therein;

said support frame includes fastening devices said floatation devices secured to said support frame thereby;

said plurality of paddles are affixed to said continuous side surface in a staggered sigmoidal pattern;

said paddles are perforated;

said paddles are elliptically shaped, said elliptical shape formed by progressive bends in said paddles;

said paddles have a series of generally fan shaped bends;

said paddles are wider at the base and narrower at the ends.

12. A method of aerating or destratifying a liquid by mounting aerator paddles in a sigmoidally staggered pattern to the exterior of a sealed internally driven drum containing a motor and geardrive within it, wherein said paddles are elliptical and perforated, the aeration or destratification comprising the steps of;

electrical operation of the motor mounted internally within the drum, wherein the motor turns the gears of the geardrive, which in turn rotates the sealed drum;

rotation of said elliptical and perforated paddles through the liquid medium, thereby causing the liquid medium to be agitated and exposed to increased levels of the gaseous medium surrounding the liquid medium, and wherein the liquid medium is agitated causing mixing of stratified bands.

* * * * *